F. C. GOODWIN.
BRIDGE TOOTH.
APPLICATION FILED AUG. 25, 1919.

1,335,681. Patented Mar. 30, 1920.

WITNESS:
R. A. Thomas.

INVENTOR.
BY F. C. Goodwin
Victor J. Evans
ATTORNEY.

UNITED STATES PATENT OFFICE.

FRANK C. GOODWIN, OF PORTSMOUTH, OHIO.

BRIDGE-TOOTH.

1,335,681.    Specification of Letters Patent.    Patented Mar. 30, 1920.

Application filed August 25, 1919. Serial No. 319,535.

*To all whom it may concern:*

Be it known that I, FRANK C. GOODWIN, citizen of the United States, residing at Portsmouth, in the county of Scioto and State of Ohio, have invented new and useful Improvements in Bridge-Teeth, of which the following is a specification.

This invention relates to a bridge tooth, and more particularly to an interchangeable posterior bridge tooth with a metal protecting element for the occlusal surface.

The tooth includes a facing element of porcelain, of the interchangeable type, and having a shank portion formed thereon, and a protecting element to which the shank portion is cemented, said protecting elements being connected by soldering, in the operation of forming the bridge.

The invention consists in the construction and formation of the elements, and the manner of assembling the latter.

Figure 1:
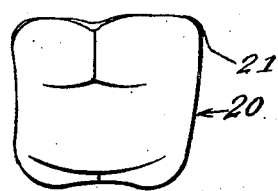
Figures 1 and 2 are views in elevation, from different angles.
Figure 2:
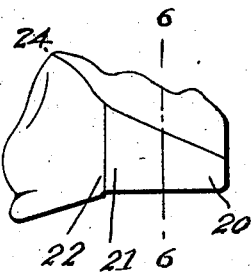
Figure 3:
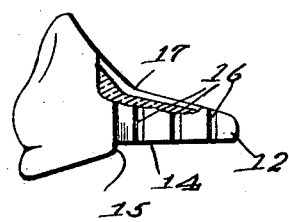
Fig. 3 is a view, chiefly in elevation, showing the porcelain element.
Figure 4:
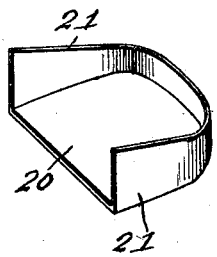
Fig. 4 is a perspective view of the metallic backing.
Figure 5:
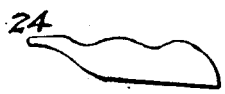
Fig. 5 is a view of the tip, detached.
Figure 6:
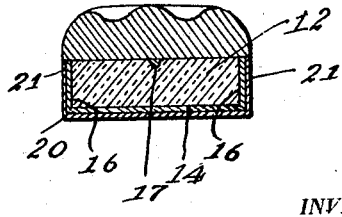
Fig. 6 is a section on line 6—6 of Fig. 2.

In carrying out my invention, I make use of a facing element 10, of porcelain, this element being provided with a shank portion 12, cutaway to form a plane surface 14, this surface terminating in an abrupt wall 15. The sides of the shank portion are grooved in the manner shown, the grooves being designated 16, and additional grooves may be provided as shown at 17, if desired.

The metallic backing consists of an element 20 having a flat portion presenting a plane surface upon which the plane surface 14 of the shank portion 12, is received. The edge portion of the element 20 is provided with a flange, those portions 21 adjacent to the straight edge 22 of the element named being higher than the intermediate portions of the flange. The tip 24 is soldered to the edge portion of the flange.

The metallic protecting elements 20 constituting sockets are connected in series by soldering, in the operation of forming the bridge, the sockets being then filled with cement and the teeth proper inserted and pressed to position, the cement entering the grooves and contacting with all adjacent surfaces and edges of the respective sockets and teeth mounted therein.

What is claimed is—

1. A bridge tooth comprising a facing provided with a shank portion, a protecting element of socket formation for receiving said shank portion and a tip extending across the shank and secured to the protecting element.

2. A bridge tooth comprising a facing element provided with a shank portion, a protecting element constituting a socket member and having a plane surface and a flanged portion projecting therefrom and a tip extending across the shank, and having its edges connected with the edges of the flanged portion.

3. A bridge tooth comprising a facing element provided with a shank portion having a plane surface and an abrupt wall adjacent to said plane surface, and a protecting element having a plane surface, for receiving the plane surface of the shank portion, the protecting element also including a flanged portion engaging the sides of the shank portion of the tooth.

4. A bridge tooth comprising a facing element provided with a shank portion having a plane surface and an abrupt wall adjacent thereto, said shank portion having grooves on the edges thereof, and a protecting element comprising a flat member and a flanged member, said flat member lying adjacent to the plane surface of the shank, and the flanged portion contacting with the edge portions of the shank, the facing element and protecting element being secured together by cement, and a tip for the tooth connected with the flanged portion of the protecting element.

In testimony whereof I affix my signature.

FRANK C. GOODWIN.